United States Patent
Jiang et al.

(10) Patent No.: US 10,006,373 B2
(45) Date of Patent: Jun. 26, 2018

(54) TWO DEGREE-OF-CONSTRAINT SEMI-FUSIBLE GEARBOX MOUNTING LINK

(71) Applicant: Hamilton Sundstrand Corporation, Charlotte, NC (US)

(72) Inventors: Yiwei Jiang, Rockford, IL (US); Michael R. Blewett, Stillman Valley, IL (US)

(73) Assignee: Hamilton Sundstrand Coporation, Charlotte, NC (US)

( * ) Notice: Subject to any disclaimer, the term of this patent is extended or adjusted under 35 U.S.C. 154(b) by 151 days.

(21) Appl. No.: 15/069,454

(22) Filed: Mar. 14, 2016

(65) Prior Publication Data

US 2017/0260910 A1 Sep. 14, 2017

(51) Int. Cl.
*F02C 7/32* (2006.01)
*F16H 57/025* (2012.01)
(Continued)

(52) U.S. Cl.
CPC .............. *F02C 7/32* (2013.01); *F01D 25/28* (2013.01); *F16H 57/025* (2013.01);
(Continued)

(58) Field of Classification Search
CPC ...... F02C 7/32; F02C 7/20; F02C 7/36; F16H 57/025; F05D 2260/37; F05D 2260/311; F05D 2260/30; F05D 2260/3011; F05D 2240/90; F05D 2240/91; F05D 2240/9151; B64D 27/26; B64D 2027/262; B64D 2027/264; B64D 2027/266; B64D 2027/268; Y10T 403/11; F01D 21/04; F01D 25/28; Y10S 248/909
(Continued)

(56) References Cited

U.S. PATENT DOCUMENTS 4,500,054 A 2/1985 Osborn
5,474,258 A * 12/1995 Taylor .................... B64D 27/26
244/54
(Continued)

FOREIGN PATENT DOCUMENTS

EP 2559883 A2 2/2013

OTHER PUBLICATIONS

Extended European Search Report for EP Application No. 17158342.0, dated Aug. 7, 2017, 6 pages.

*Primary Examiner* — Keith J Frisby
(74) *Attorney, Agent, or Firm* — Kinney & Lange, P.A.

(57) ABSTRACT

A gearbox mounting link between a gas turbine engine structure and a gearbox mounting location comprises two engine attachment brackets secured to an engine structure, and attachment plate rotatably attached between the engine attachment brackets, and a secondary retention sleeve and fastener. The attachment plate includes a fusibly separable section configured to attach to the gearbox, a static section, and a shear necks connecting the statis section to the fusibly separable section. The secondary retention sleeve is supported by and secured to the static section. The secondary retention fastener is supported by the secondary retention sleeve, and is disposed through an oversized fastener passage through the fusibly separable section, thereby loosely retaining the fusibly separable section in at least one of the two degrees of freedom in the event of a load sufficient to break the shear necks, separating the fusible separable section from the static section.

20 Claims, 3 Drawing Sheets

(51) Int. Cl.
*F01D 25/28* (2006.01)
*B64D 27/26* (2006.01)

(52) U.S. Cl.
CPC .... *B64D 2027/268* (2013.01); *F05D 2260/30* (2013.01); *F05D 2260/311* (2013.01); *F05D 2260/96* (2013.01)

(58) Field of Classification Search
USPC .......... 244/54; 248/554; 60/796, 797; 403/2; 74/606 R
See application file for complete search history.

(56) References Cited

U.S. PATENT DOCUMENTS

| | | | | |
|---|---|---|---|---|
| 5,860,623 | A * | 1/1999 | Dunstan | B64D 27/18 244/54 |
| 5,921,500 | A * | 7/1999 | Ellis | B64D 27/20 244/54 |
| 5,927,644 | A * | 7/1999 | Ellis | B64D 27/26 244/54 |
| 6,212,974 | B1 | 4/2001 | Van Duyn | |
| 7,942,580 | B2 * | 5/2011 | Audart-Noel | B64D 27/26 244/54 |
| 8,561,501 | B2 | 10/2013 | Niggemeier et al. | |
| 9,227,734 | B2 * | 1/2016 | Zheng | B64D 27/26 |
| 2011/0239660 | A1 | 10/2011 | Suciu et al. | |
| 2013/0180262 | A1 | 7/2013 | Duong | |
| 2014/0127000 | A1 | 5/2014 | Abousleiman et al. | |
| 2014/0130628 | A1 | 5/2014 | Abousleiman et al. | |
| 2014/0174252 | A1 | 6/2014 | Davis et al. | |
| 2016/0083101 | A1 * | 3/2016 | Ronski | F16F 9/10 60/783 |

\* cited by examiner

TWO DEGREE-OF-CONSTRAINT SEMI-FUSIBLE GEARBOX MOUNTING LINK

BACKGROUND

The present invention relates generally to support structures, and more particularly to a mounting link between an engine structure and an attached structure such as an auxiliary gearbox.

Aircraft gas turbine auxiliary gearboxes are expected to withstand a variety of loads, from routine vibrational loads to sudden or extreme shocks caused by hard landings. The most extreme loads come from so-called "blade-off" events, when blades of the engine detach due to impacts or the like, causing severe shocks and often major damage to the working engines. Blade-off event loads are extremely unpredictable, but can be more than an order of magnitude stronger than any other sudden or extreme shock gas turbine engines are expected to experience, such as impacts due to hard landings. Extreme loads can cause damage to the gearbox itself, as well as to attached peripheral systems driven by the gearbox. In addition, extreme loads that damage or disconnect parts of the gearbox from the engine can result in potentially dangerous oil leakages. For all of these reasons conventional gearboxes and gearbox connections are constructed to rigidly withstand all anticipated loads.

SUMMARY

In one aspect, the present invention is directed toward a gearbox mounting link between a gas turbine engine structure and a gearbox mounting location comprises two engine attachment brackets secured to an engine structure, and attachment plate rotatably attached between the engine attachment brackets, and a secondary retention sleeve and fastener. The attachment plate includes a fusibly separable section configured to attach to the gearbox, a static section, and a shear necks connecting the static section to the fusibly separable section. The secondary retention sleeve is supported by and secured to the static section. The secondary retention fastener is supported by the secondary retention sleeve, and is disposed through an oversized fastener passage through the fusibly separable section, thereby loosely retaining the fusibly separable section in at least one of the two degrees of freedom in the event of a load sufficient to break the shear necks, separating the fusible separable section from the static section.

In another aspect, the present invention is directed toward a method of attaching a gearbox to a gas turbine engine structure by attaching first and second engine attachment brackets to the gas turbine engine structure, rotatably securing an attachment plate between the first and second engine attachment brackets, and connecting the attachment plate to the gearbox. The attachment plate includes a static section supporting a secondary retention sleeve, a fusibly separable section, and shear necks connecting the fusibly separable section to the static section. The fusibly separable section is rigidly attached to the gearbox, while the static section is rotatably attached to the engine attachment brackets, such that the gearbox is retained along two degrees of freedom with respect to the gas turbine engine structure. A secondary retention fastener is secured through the secondary retention sleeve and an oversized fastener passage of the fusibly separable section, such that the secondary retention fastener cannot abut the retention sleeve so long as the shear necks remain intact.

The present summary is provided only by way of example, and not limitation. Other aspects of the present disclosure will be appreciated in view of the entirety of the present disclosure, including the entire text, claims, and accompanying figures.

Figure 1:
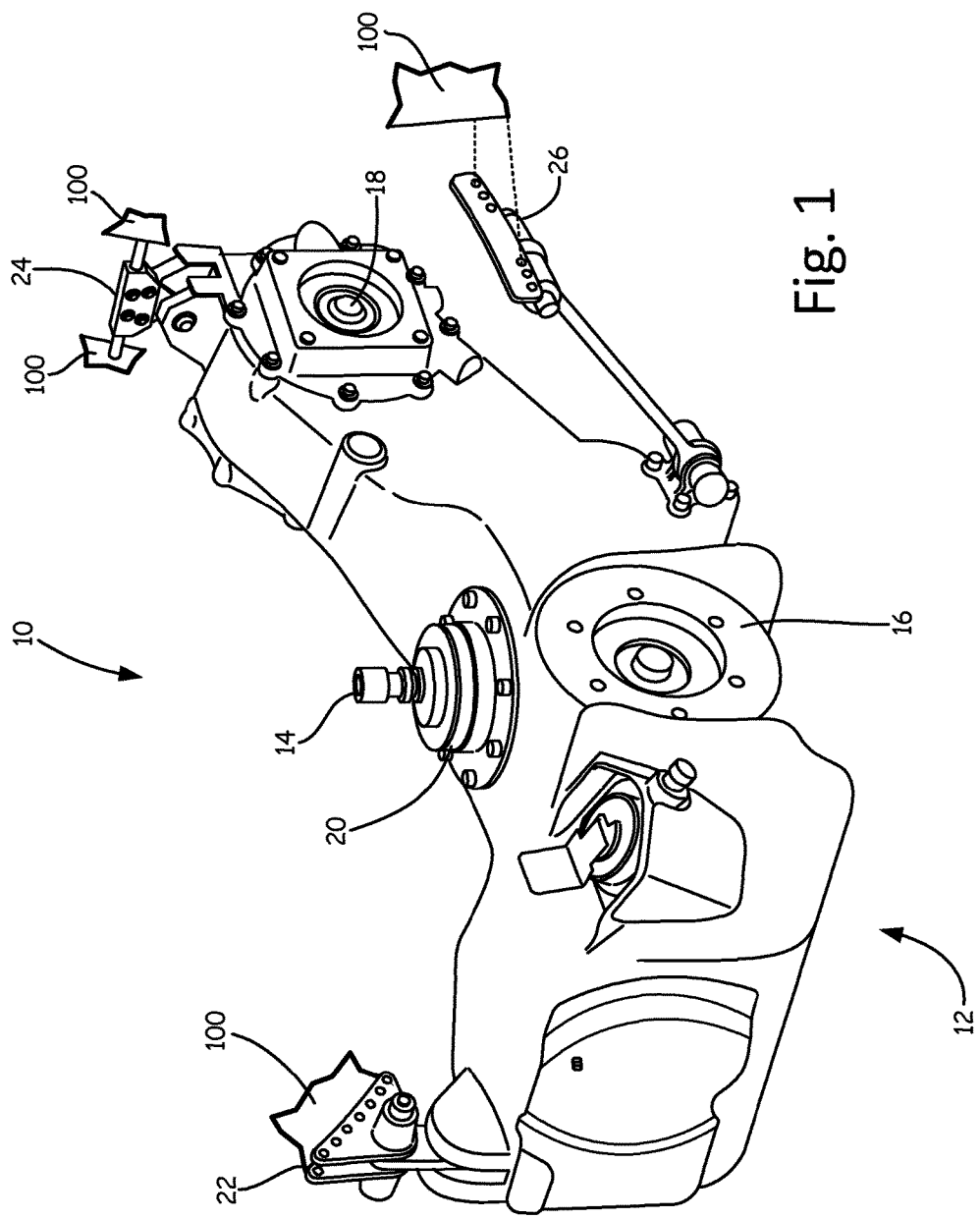
FIG. 1 is a perspective view of an auxiliary gearbox for a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention connects an engine to a gearbox via a mounting link comprising an attachment plate with a fusibly separable section and a static section, and a secondary retention sleeve anchored to the static section. The gearbox is rigidly bolted to a primary retention location in the fusibly separable section of the attachment plate, constraining relative movement of the gearbox in two degrees of freedom. Under extreme loads, this fusibly separable section breaks away from the static section, but remains loosely retained in at least one of the two degrees of freedom by a secondary bolt passing through the secondary retention sleeve and an oversized fastener passage through the fusibly separable section.

FIG. 1 is a perspective view of gearbox assembly 10, which includes gearbox 12 and supporting elements sufficient to secure gearbox 12 with respect to engine 100. Engine 100 is depicted only schematically, and can, for example, be an aircraft gas turbine engine with a structural engine case, or another engine component to which gearbox 12 is secured. Gearbox assembly 10 includes driveshaft connection 14, peripheral load connections 16 and 18, seal 20, and mounting links 22, 24, and 26. Gearbox 12 can, for example, be an auxiliary gearbox disposed to transmit torque from engine 100 to a variety of peripheral loads not directly related to operation of engine 100 or to propulsion (e.g. to a generator or air circulation system).

Driveshaft connection 14 attaches to a shaft of engine 100 for torque transmission. Peripheral load connections 16 and 18 are two illustrative auxiliary driveshaft connection points for attachment of peripheral loads to gearbox 12. Peripheral loads can include any systems driven by, but not included within, engine 100, including but not limited to air circulation systems and electrical generators. Although only two peripheral load connections 16 and 18 are depicted in FIG.

1, gearbox 12 can more generally support any number and location of peripheral load connections.

Seal 20 and mounting links 22, 24, and 26 collectively constrain gearbox 12 with respect to gas turbine engine structure 100 in all six translational and rotational degrees of freedom, without overconstraining gearbox 12. Seal 20 can, for example, be a spigot-type annular seal that constrains gearbox 12 in two degrees of freedom corresponding to the normal basis of the reference plane on which seal 20 lies. In the depicted embodiment, mounting links 22 and 26 each provide a single independent degree of constraint, while mounting link 24 provides two more independent degrees of constraint. More generally, the collection of all linkages connecting gearbox 12 to engine 100 (including seal 20) provides a total of six independent constraints on the translational and rotational freedom of gearbox 12 with respect to engine 100. In alternative embodiments, these constraints can be distributed about more or fewer separate linkages. The independence of these constraints prevents overconstraint (e.g. two links constraining the same degree of freedom) that would necessitate tighter tolerances and could increase damage done to the gearbox and/or the linkages in the event of severe impacts. The locations and number of degrees of freedom constrained by each linkage may vary across different embodiments, so long as the collection of all linkages constrains all six degrees of freedom without significantly overconstraining any.

Figure 2:
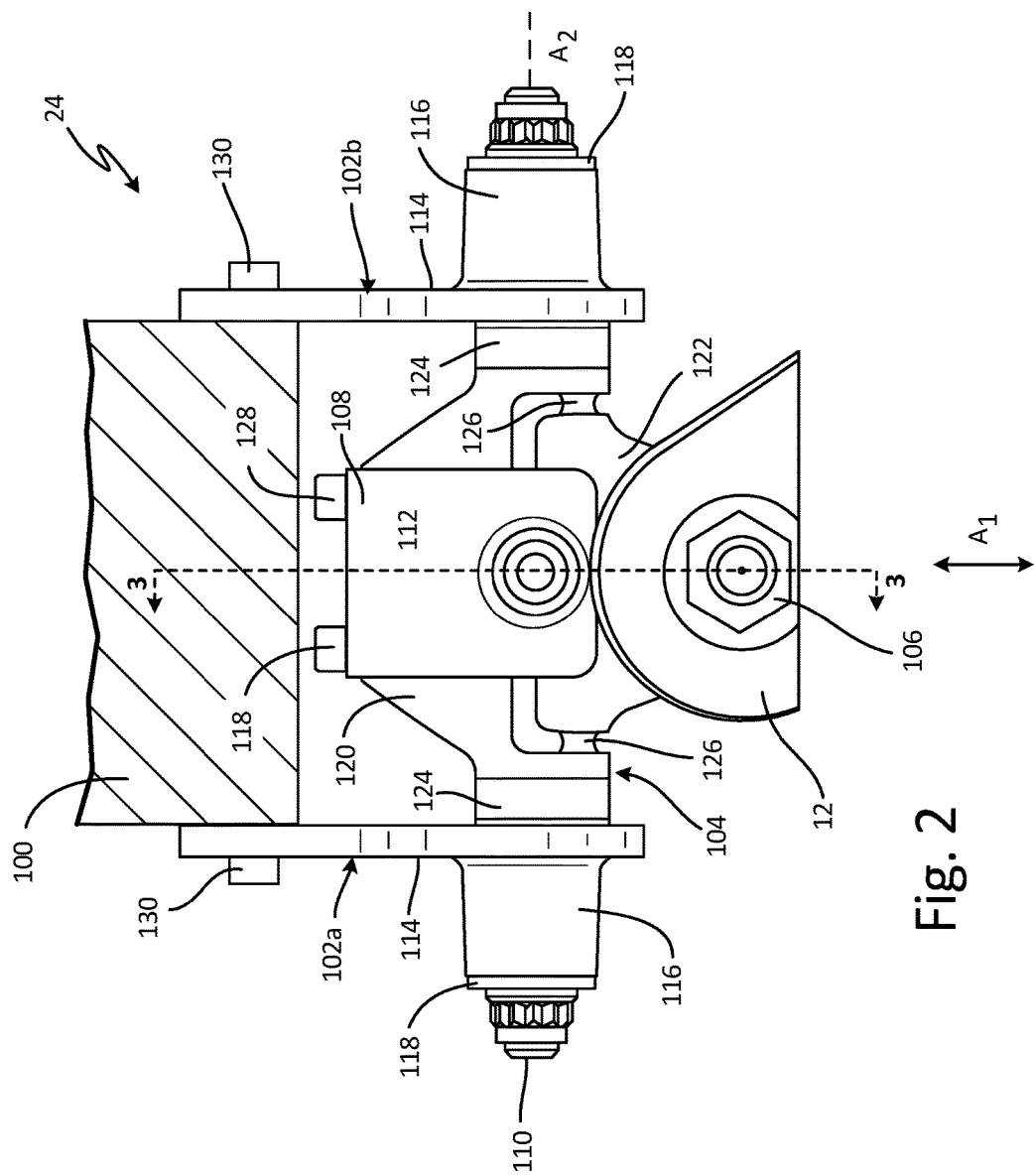
FIG. 2 is a perspective view of a mounting link between the gas turbine engine and the auxiliary gearbox, in an ordinary operating state.

FIG. 2 is a perspective view of mounting link 24, illustrating gearbox 12, engine 100, engine attachment brackets 102a and 102b (hereinafter collectively referred to as engine attachment brackets 102), attachment plate 104, gearbox fastener 106, secondary retention sleeve 108, plate fasteners 110, secondary retention fastener 112, engine attachment flanges 114, fastener support sections 116, spacers 118, static section 120, fusibly separable section 122, pivot section 124, shear necks 126, sleeve fasteners 128, and engine fasteners 130.

In the illustrated embodiment, mounting link 24 is a support structure disposed between gearbox 12 and engine 100 to constrain movement of gearbox 12 relative to engine 100 in two translational degrees of freedom defined by axes $A_1$ and $A_2$, in the plane of FIG. 2. Mounting link 24 comprises engine attachment brackets 102 that rigidly fasten to engine 100 via engine fasteners 130, and attachment plate 104 that rigidly fastens to gearbox 12 via gearbox fasteners 106. In the illustrated embodiment, engine attachment brackets 102 each include an engine attachment flange 114 that is secured to engine 100 by fasteners 130, which can for example be bolts, pins or other fasteners disposed through engine attachment flange and into engine 100. As shown in FIG. 2, engine attachment brackets 102 further include fastener support sections 116, which are cylindrical support passages that carry plate fasteners 110. Spacers 118 can, for example, be washers situated between support sections 116 and plate fasteners 110. Plate fasteners 110 can be pins or bolts that pass through fastener support sections 116 to mate with pivot sections 124 of attachment plate 104 on opposite sides of attachment plate 104. In alternative embodiments, plate fasteners 110 can be rods or posts extending from, and potentially formed monolithically with, attachment plate 104. Generally, engine attachment brackets 102 attach to engine 100 and rotatably support attachment plate 104 such that attachment plate 104 is able to pivot about axis $A_2$ thereby avoiding overconstraining any degrees of freedom of gearbox 12 other than translational movement along axes $A_1$ and $A_2$.

Attachment plate 104 connects to gearbox 12 via fastener 106. This connection is rigid with respect to at least two the two degrees of freedom defined by axes $A_1$ and $A_2$, but may be flexible with respect to other degrees of freedom. In some embodiments, for example, fastener 106 can be a rotatable connection via a pin or bolt. In other embodiments, fastener 106 can be a spherical bearing connection permitting a further degree of rotational freedom.

Attachment plate 104 connects engine attachment brackets 102 to gearbox 12, and is an interrupted plate formed, for example, as a single monolithic, unitary, rigid piece. Attachment plate 104 includes static section 120 with pivot sections 124 and fusibly separable section 122 connected to static section 120 only by shear necks 126. Attachment plate 104 extends across a plane with the translational degrees of constraint of mounting link 24 as bases. Static section 120 extends rigidly across the full width (along axis $A_2$) of attachment plate 104, terminating at either end in pivot sections 124 that interface with plate fasteners 110 to rotatably secure attachment plate 104 to engine attachment brackets 102. Fusibly separable section 122 is partially surrounded by static section 120, and extends from static section 120 away from engine 100, towards gearbox 12. In the depicted embodiment, static section 120 has a curved bracket-shaped ("{") profile facing fusibly separable section 122 and extending in the $A_2$ direction alongside at least a portion of fusibly separable section 122 connected to static section 120 via shear necks 126. Gearbox fastener 106 mates with fusibly separable section 122 of attachment plate 104 at a distal end furthest from engine 100.

Secondary retention sleeve 108 is a retention piece disposed about and connected to static section 120 of attachment plate 104. Secondary retention sleeve 108 is described in greater detail below with respect to FIG. 3, but generally covers a portion of opposite faces of attachment plate 104, and extends around and away from a proximal end of static section 120 closest to engine 100, towards fusibly separable section 122. Secondary retention sleeve 108 is secured to static section 120 via sleeve fasteners 128, which can for example be bolts or screws. Secondary retention sleeve 108 carries secondary retention fastener 112, which can for example be a pin, rod, or bolt extending through secondary retention fastener 112 and a corresponding oversized passage through fusibly separable section 122 (see FIG. 3). During ordinary operation, attachment plate remains a single unbroken piece, with static section 120 connected to fusibly separable section 122 via shear necks. In this configuration, shear necks 126 support fusibly separable section 122, and thereby gearbox 12, rigidly with respect to engine 100 in two degrees of freedom, as noted above. Shear necks 126 break in the event of extreme loads, however, leaving fusibly separable section 122 disconnected from static section 120, and supported with respect to static section 120 only by the engagement of fusibly separable section 122 with fastener 112, which is supported on static section 120 by secondary retention sleeve 108.

Figure 3:
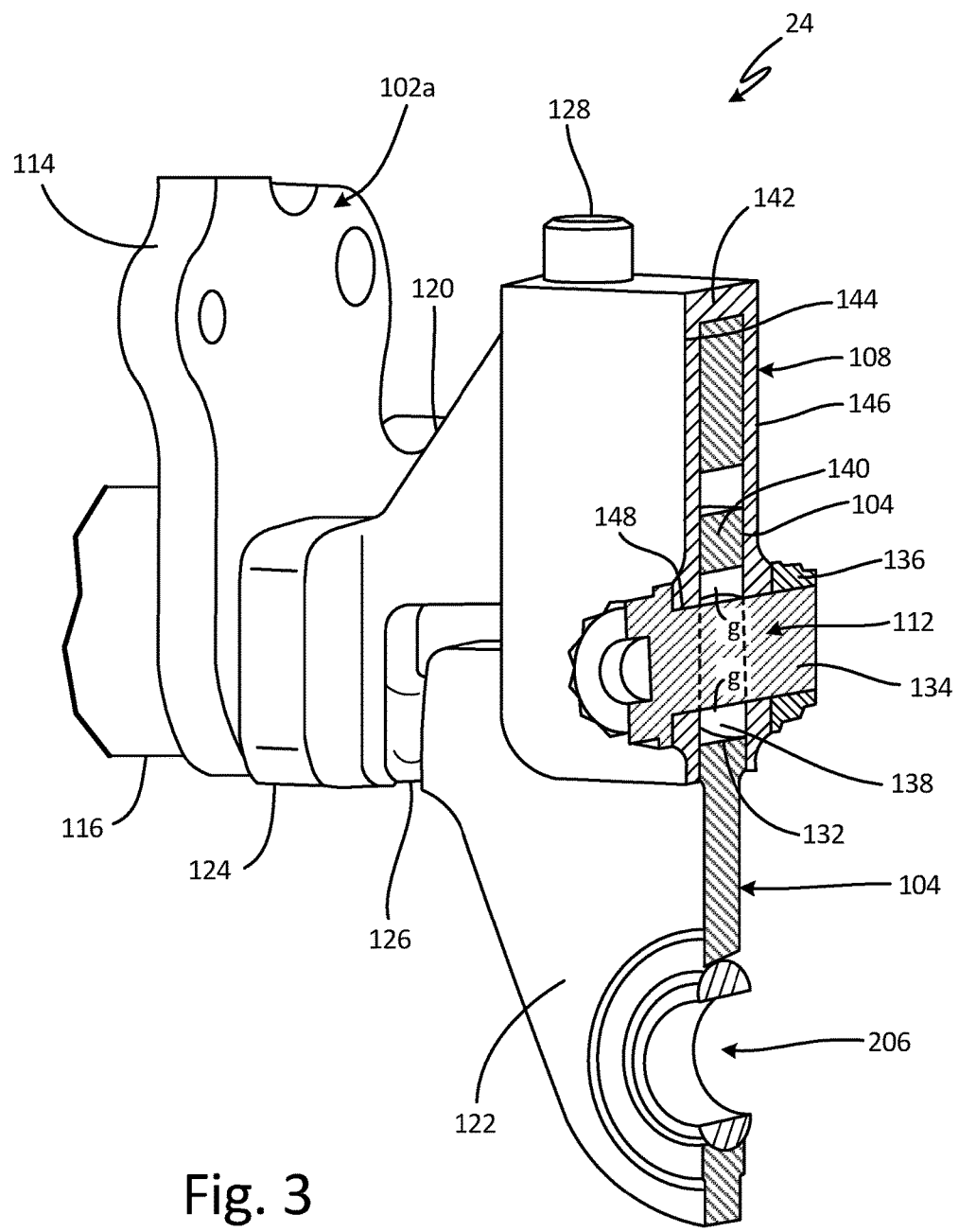
FIG. 3 is a cross-sectional perspective view of the mounting link of FIG. 2, illustrating operation of a mechanical fuse.

FIG. 3 is a cross-sectional perspective view of mounting link 24 through section line 3-3 of FIG. 2. In contrast to FIG. 2, FIG. 3 illustrates attachment plate 104 in its broken state, with shear neck 126 broken and fusibly separable section 122 accordingly detached from static section 120. FIG. 3 illustrates engine attachment bracket 102a (with engine attachment flange 114 and fastener support section 116), attachment plate 104 (with static section 120, fusibly separable section 122, pivot section 124, and shear necks 126), secondary retention sleeve 108, secondary retention fastener 112, and sleeve fastener 128 as described above with respect to FIG. 2. FIG. 3 further illustrates oversized fastener passage 132, bolt 134 and nut 136 of secondary retention fastener 112, secondary retention damper 138, separable section arch 140, sleeve end 142, sleeve sides 144 and 146, retention fastener support passage 148, and gearbox fastener passage 206 for gearbox fastener 106.

Static section 122 includes oversized fastener passage 140, a passage that allows secondary retention fastener 112 to pass through static section 122 with clearance that permits mechanical play along axes $A_1$ and $A_2$, while still constraining static section 122 along these axes. In the illustrated embodiment, secondary retention fastener 112 comprises bolt 134 with nut 136, and oversized fastener passage 132 contains secondary retention damper 138, an annular vibration and shock damping element disposed between secondary retention fastener 112 and walls of oversized fastener passage 132. In some embodiments, engine attachment brackets 102 and attachment plate 104 can be formed of steel, and secondary retention damper 138 can be formed of rubber. In the illustrated embodiment, at least some portions of secondary retention fastener 112 are separated from secondary retention damper 138 by gap g. In other embodiments, where secondary retention damper 138 is sufficiently compressible, retention secondary retention damper 138 can fill the entire space between secondary retention fastener 112 and fusibly separable section 122 of attachment plate 104. In the illustrated embodiment, fusibly separable section 122 extends towards engine 100 in separable section arch 140 to surround oversized fastener passage 132.

Retention sleeve 108 includes sleeve end 142 and sleeve sides 144 and 146. Sleeve sides 144 and 146 are plates extending parallel to and alongside faces of attachment plate 104, and are connected via sleeve end 142, which abuts a top edge of attachment plate 104 and can be arranged generally perpendicularly to sleeve sides 144 and 146. In the illustrated embodiment, sleeve fasteners 128 pass through sleeve end 142 to secure secondary retention sleeve 108 to static section 120. Secondary retention sleeve 108 includes retention fastener support passage 148, a passage that fits and supports secondary retention fastener 112, thereby holding secondary retention fastener 112 at a fixed location relative to static section 120 of attachment plate 104. In at least some embodiments, sleeve sides 144 and 146 snugly secure fusibly separable section 122 of attachment plate 104, thereby providing Coulomb damping against vibration along at least one of axes $A_1$ and $A_2$.

As stated above, shear necks 126 connect static section 120 to fusibly separable section 122. Shear necks 126 are designed to shear at a known load magnitude corresponding to a maximum load transmission from engine 100 to gearbox 12. This can be accomplished by selecting an appropriately durable width and material for shear necks 126. In general, shear necks 126 must be at least strong enough to withstand peak non-destructive impact loads such as low cycle loads from hard landings and other non-routine but expected shocks. These loads can, for example, reach 10-15 Gs. In at least some embodiments, shear necks 126 will not break until loads at least 10-25 times higher than expected low cycle loads. Very few loads experienced during aircraft engine operation reach these levels, but shocks due to blade-off events can be high enough to sever shear necks 126.

Mounting link 24 rigidly constrains translation of gearbox 12 along axes $A_1$ and $A_2$ with respect to engine 100 under ordinary load conditions, including low occurrence, high magnitude shocks such as due to hard landings. Shear necks 126 fracture in the event of extreme shocks such as from blade-off events, permitting fusibly separable section 122 to move with respect to static section 120, while still constraining this movement via secondary retention sleeve 108 and secondary retention fastener 112. In this way, mounting link 24 limits or prevents damage that could otherwise be done to gearbox 12 and its attached peripherals by transmitting such extreme loads, while simultaneously helping to prevent gearbox 12 from detaching from engine 100.

Discussion of Possible Embodiments

The following are non-exclusive descriptions of possible embodiments of the present invention.

A gearbox mounting link between a gas turbine engine structure and a gearbox mounting location, the mounting link comprising: first and second engine attachment brackets configured to be secured to the gas turbine engine structure; an attachment plate rotatably secured to and extending between the first and second engine attachment brackets, the attachment plate comprising: a fusibly separable section configured to attach to the gearbox, so as to constrain motion of the gearbox in two degrees of freedom; a static section formed integrally with the fusibly separable section; and shear necks connecting the static section to the fusibly separable section; a secondary retention sleeve supported by and secured to the static section; and a secondary retention fastener supported by the secondary retention sleeve, and disposed through an oversized fastener passage through the fusibly separable section, thereby loosely retaining the fusibly separable section in at least one of the two degrees of freedom after separation of the fusibly separable section from the static section.

The gearbox mounting link of the preceding paragraph can optionally include, additionally and/or alternatively, any one or more of the following features, configurations and/or additional components:

A further embodiment of the foregoing gearbox mounting link, wherein the fusible section is configured to attach to the gearbox via a primary retention fastener passing through fusible section and a structure of the gearbox.

A further embodiment of the foregoing gearbox mounting link, further comprising a damper disposed within the oversized fastener passage, between the fusibly separable section and the secondary retention fastener.

A further embodiment of the foregoing gearbox mounting link, wherein the damper is formed of rubber.

A further embodiment of the foregoing gearbox mounting link, wherein the attachment plate extends primarily along a plane defined by the two degrees of freedom.

A further embodiment of the foregoing gearbox mounting link, wherein the attachment plate is formed of steel.

A further embodiment of the foregoing gearbox mounting link, wherein the shear necks are configured to withstand a load of at least 10-15 Gs.

A further embodiment of the foregoing gearbox mounting link, wherein the shear necks are oriented to shear along one of the two degrees of freedom.

A further embodiment of the foregoing gearbox mounting link, wherein the secondary retention sleeve comprises first and second sleeve plates each parallel to the attachment plate, and abutting the attachment plate on opposite sides.

A further embodiment of the foregoing gearbox mounting link, wherein the first and second sleeve plates are connected at a distal region, and wherein the secondary retention sleeve is secured to the static section via fasteners passing through the distal section.

A further embodiment of the foregoing gearbox mounting link, wherein the static section and the fusibly separable section lie in a common plane, and are separated by a gap bridged in the common plane only by the shear necks.

A method of attaching a gearbox to a gas turbine engine structure, the method comprising: attaching first and second engine attachment brackets to the gas turbine engine structure; rotatably securing an attachment plate between the first and second engine attachment brackets, the attachment plate including a static section supporting a secondary retention sleeve, a fusibly separable section, and shear necks connecting the fusibly separable section to the static section; rigidly attaching the fusibly separable section to the gearbox, such that the gearbox is retained along two degrees of freedom with respect to the gas turbine engine structure; securing a secondary retention fastener through the secondary retention sleeve and an oversized fastener passage of the fusibly separable section, such that the secondary retention fastener cannot abut the fusibly separable section so long as the shear necks remain intact.

The method of the preceding paragraph can optionally include, additionally and/or alternatively, any one or more of the following features, configurations and/or additional components:

A further embodiment of the foregoing method, further comprising loosely retaining the fusibly separable section on the secondary retention fastener after the shear necks have broken thereby separating the fusibly separable section from the static section.

A further embodiment of the foregoing method, further comprising suppressing movement of the secondary retention fastener relative to the oversized fastener passage via a damper disposed therebetween.

A further embodiment of the foregoing method, further retaining the fusibly separable section snugly between first and second plates of the secondary retention sleeve.

An engine assembly comprising: an engine with an engine frame; a gearbox driven by the engine; and a gearbox mounting link connecting the gearbox to the engine frame, the gearbox mounting link comprising: first and second engine attachment brackets configured to be secured to the gas turbine engine structure; an attachment plate rotatably secured to and extending between the first and second engine attachment brackets, the attachment plate comprising: a fusibly separable section configured to attach to the gearbox, so as to constrain motion of the gearbox in two degrees of freedom; a static section formed integrally with the fusibly separable section; and shear necks connecting the static section to the fusibly separable section; a secondary retention sleeve supported by and secured to the static section; and a secondary retention fastener supported by the secondary retention sleeve, and disposed through an oversized fastener passage through the fusibly separable section, thereby loosely retaining the fusibly separable section in at least one of the two degrees of freedom after separation of the fusibly separable section from the static section.

The engine assembly of the preceding paragraph can optionally include, additionally and/or alternatively, any one or more of the following features, configurations and/or additional components:

A further embodiment of the foregoing engine assembly, wherein the fusible section is configured to attach to the gearbox via a primary retention fastener passing through fusible section and a structure of the gearbox.

A further embodiment of the foregoing engine assembly, further comprising a damper disposed within the oversized fastener passage, between the fusibly separable section and the secondary retention fastener.

A further embodiment of the foregoing engine assembly, wherein the attachment plate extends primarily along a plane defined by the two degrees of freedom.

A further embodiment of the foregoing engine assembly, wherein the shear necks are configured to withstand a load of at least 10-15 Gs.

A further embodiment of the foregoing engine assembly, wherein the static section and the fusibly separable section lie in a common plane, and are separated by a gap bridged in the common plane only by the shear necks.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gearbox mounting link between a gas turbine engine structure and a gearbox mounting location, the gearbox mounting link comprising:
    first and second engine attachment brackets configured to be secured to the gas turbine engine structure;
    an attachment plate rotatably secured to and extending between the first and second engine attachment brackets, the attachment plate comprising:
        a fusibly separable section configured to attach to the gearbox, so as to constrain motion of the gearbox in two degrees of freedom;
        a static section formed integrally with the fusibly separable section; and
        shear necks connecting the static section to the fusibly separable section;
    a secondary retention sleeve supported by and secured to the static section; and
    a secondary retention fastener supported by the secondary retention sleeve, and disposed through an oversized fastener passage through the fusibly separable section, thereby loosely retaining the fusibly separable section in at least one of the two degrees of freedom after separation of the fusibly separable section from the static section.

2. The gearbox mounting link of claim 1, wherein the fusibly separable section is configured to attach to the gearbox via a primary retention fastener passing through the fusibly separable section and a structure of the gearbox.

3. The gearbox mounting link of claim 1, further comprising a damper disposed within the oversized fastener passage, between the fusibly separable section and the secondary retention fastener.

4. The gearbox mounting link of claim 3, wherein the damper is formed of rubber.

5. The gearbox mounting link of claim 1, wherein the attachment plate extends primarily along a plane defined by the two degrees of freedom.

6. The gearbox mounting link of claim 1, wherein the attachment plate is formed of steel.

7. The gearbox mounting link of claim 1, wherein the shear necks are configured to withstand a load of at least 10-15 Gs.

8. The gearbox mounting link of claim 7, wherein the shear necks are oriented to shear along one of the two degrees of freedom.

9. The gearbox mounting link of claim 1, wherein the secondary retention sleeve comprises first and second sleeve plates each parallel to the attachment plate, and abutting the attachment plate on opposite sides.

10. The gearbox mounting link of claim 9, wherein the first and second sleeve plates are connected at a distal region furthest from the gas turbine engine structure, and wherein the secondary retention sleeve is secured to the static section via fasteners passing through the distal region.

11. The gearbox mounting link of claim 1, wherein the static section and the fusibly separable section lie in a common plane, and are separated by a gap bridged in the common plane only by the shear necks.

12. A method of attaching a gearbox to a gas turbine engine structure via the gearbox mounting link of claim 1, the method comprising:
  attaching the first and second engine attachment brackets to the gas turbine engine structure;
  rotatably securing the attachment plate between the first and second engine attachment brackets;
  rigidly attaching the fusibly separable section to the gearbox, such that the gearbox is retained along two degrees of freedom with respect to the gas turbine engine structure;
  securing the secondary retention fastener through the secondary retention sleeve and the oversized fastener passage, such that the secondary retention fastener cannot abut the fusibly separable section so long as the shear necks remain intact.

13. The method of claim 12, further comprising loosely retaining the fusibly separable section on the secondary retention fastener after the shear necks have broken thereby separating the fusibly separable section from the static section, and suppressing movement of the secondary retention fastener relative to the oversized fastener passage via a damper disposed therebetween.

14. The method of claim 12, further retaining the fusibly separable section snugly between first and second plates of the secondary retention sleeve.

15. An engine assembly comprising:
  an engine with an engine frame;
  a gearbox driven by the engine; and
  a gearbox mounting link connecting the gearbox to the engine frame, the gearbox mounting link comprising:
    first and second engine attachment brackets configured to be secured to the engine frame;
    an attachment plate rotatably secured to and extending between the first and second engine attachment brackets, the attachment plate comprising:
      a fusibly separable section configured to attach to the gearbox, so as to constrain motion of the gearbox in two degrees of freedom;
      a static section formed integrally with the fusibly separable section; and
      shear necks connecting the static section to the fusibly separable section;
    a secondary retention sleeve supported by and secured to the static section; and
    a secondary retention fastener supported by the secondary retention sleeve, and disposed through an oversized fastener passage through the fusibly separable section, thereby loosely retaining the fusibly separable section in at least one of the two degrees of freedom after separation of the fusibly separable section from the static section.

16. The engine assembly of claim 15, wherein the fusibly separable section is configured to attach to the gearbox via a primary retention fastener passing through the fusibly separable section and a structure of the gearbox.

17. The engine assembly of claim 15, further comprising a damper disposed within the oversized fastener passage, between the fusibly separable section and the secondary retention fastener.

18. The engine assembly of claim 15, wherein the attachment plate extends primarily along a plane defined by the two degrees of freedom.

19. The engine assembly of claim 15, wherein the shear necks are configured to withstand a load of at least 10-15 Gs.

20. The engine assembly of claim 15, wherein the static section and the fusibly separable section lie in a common plane, and are separated by a gap bridged in the common plane only by the shear necks.

* * * * *